US006820809B2

(12) United States Patent
Juntunen et al.

(10) Patent No.: US 6,820,809 B2

(45) Date of Patent: Nov. 23, 2004

(54) LABEL-BASED CONTROLLER COMMISSIONING SYSTEM

(75) Inventors: Robert D. Juntunen, Minnetonka, MN (US); James I. Bartels, Hudson, WI (US)

(73) Assignee: Honeywell International Inc., Morristown, NJ (US)

(*) Notice: Subject to any disclaimer, the term of this patent is extended or adjusted under 35 U.S.C. 154(b) by 9 days.

(21) Appl. No.: 10/279,583

(22) Filed: Oct. 24, 2002

(65) Prior Publication Data

US 2004/0079802 A1 Apr. 29, 2004

(51) Int. Cl.[7] .................................................. G06K 7/10

(52) U.S. Cl. ............. 235/454; 235/462.01; 235/462.08; 235/472.01; 235/472.02; 235/472.03; 235/494

(58) Field of Search ............................ 235/454, 462.01, 235/462.08, 472.01, 472.02, 472.03, 494

(56) References Cited

U.S. PATENT DOCUMENTS

| | | | | | |
|---|---|---|---|---|---|
| 4,323,773 | A | * | 4/1982 | Carpenter | 235/473 |
| 4,545,210 | A | | 10/1985 | Lord | 62/77 |
| 4,750,150 | A | | 6/1988 | Weppler | 364/900 |
| 4,816,635 | A | * | 3/1989 | Edamura | 219/10.55 |
| 4,827,478 | A | | 5/1989 | Chan | 371/38 |
| 4,837,414 | A | * | 6/1989 | Edamula | 219/714 |
| 5,041,789 | A | * | 8/1991 | Keller et al. | 324/318 |
| 5,237,826 | A | | 8/1993 | Baldwin et al. | 62/77 |
| 5,519,878 | A | | 5/1996 | Dolin, Jr. | 395/800 |
| 5,534,684 | A | | 7/1996 | Danielson | 235/472 |
| 5,557,482 | A | | 9/1996 | Christensen et al. | 360/53 |
| 6,379,058 | B1 | * | 4/2002 | Petteruti et al. | 400/76 |
| 6,523,753 | B2 | * | 2/2003 | Cocuzza et al. | 235/472.01 |

* cited by examiner

*Primary Examiner*—Steven S. Paik

(57) ABSTRACT

A commissioning system incorporates a commissioning station for mounting a controller to be commissioned by the action of loading data into a writable memory of the controller. The station has a label reader for reading a label attached to the controller. Preferably the label is readable by the label reader only when the controller is mounted on the commissioning station. Data encoded in a code pattern on the label specifies commissioning parameters to be loaded into the controller memory. The label reader reads the code pattern and generates a signal encoding the code pattern data. The commissioning system receives this signal and transmits a commissioning signal to the controller encoding the commissioning parameters, which are then loaded into the controller memory. In one embodiment the commissioning station has a configuration that cooperates with the controller to create an access barrier to the label reader scanner surface when the controller is mounted on the station. The label usually carries printing identifying the commissioning parameters. The system's protocol provides for reliable and error-free controller commissioning, and avoids the need to keep large numbers of differently commissioned controllers in inventory.

20 Claims, 1 Drawing Sheet

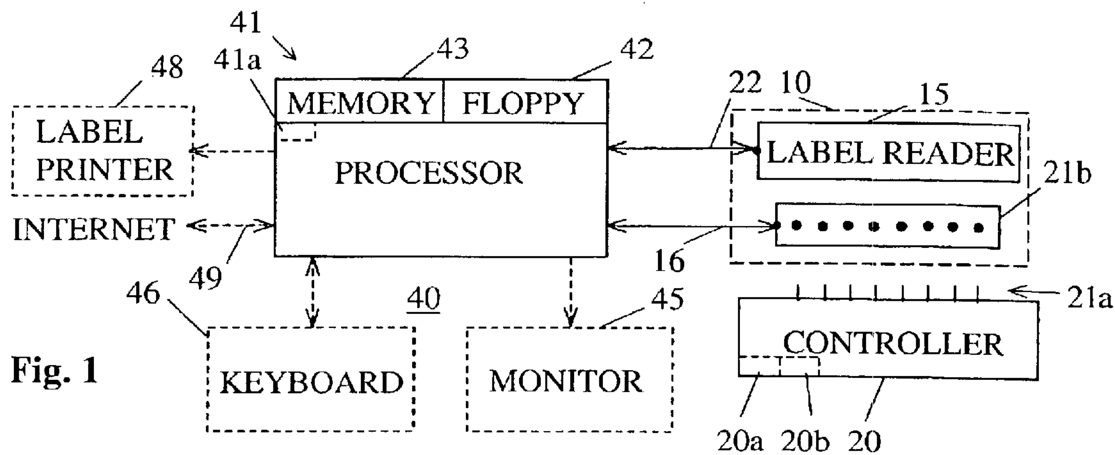
Fig. 1
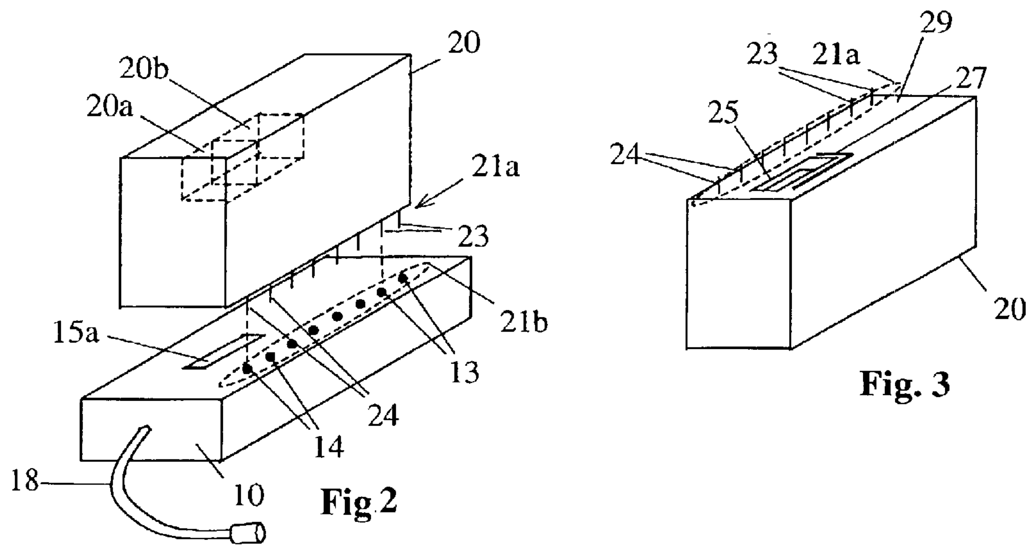
Fig 2
Fig. 3
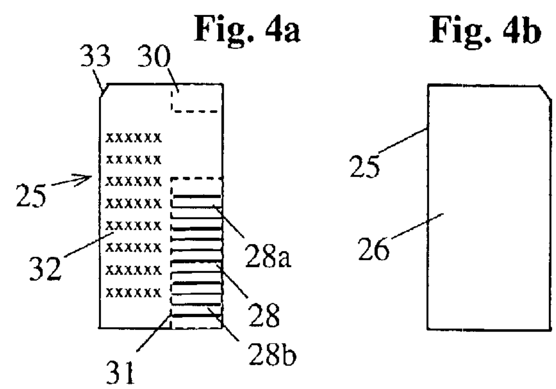
Fig. 4a
Fig. 4b

LABEL-BASED CONTROLLER COMMISSIONING SYSTEM

BACKGROUND

Certain types of what we will call controllers are used to control operating systems of various kinds. HVAC equipment, manufacturing machinery, automobiles, appliances, and electronic equipment are some of the kinds of operating systems involved here. The controllers for them typically have a microprocessor of some type along with a memory for storing the firmware executed by the microprocessor and any data parameters necessary to perform the control or other function. Loading the parameters needed for controlling a particular operating system into the microprocessor memory is called commissioning. The system-specific commissioning parameters are usually data values of some kind, but could as well be actual source code. Normally, controllers are designed so that they are inoperable until commissioned, although they may provide some sort of error indication if installed without prior commissioning.

Where the operating systems are factory-built or most of the operating systems involved are identical, the operating system manufacturer can quite easily assure proper commissioning for its controllers. Automobiles, appliances, and electronic equipment are examples of devices with factory-installed controllers that are essentially identical over a single model or group of models. Even where different models of factory-built systems are involved requiring different controller configurations, the factory environment makes this easy to accomplish.

Where a problem may arise is with another class of operating systems that are not completely assembled in a factory and have many distinct configurations each differing sufficiently in details requiring a controller with different parameters of one type or another. Heating equipment of various types and manufacturing machinery are types of such devices. Boilers for space heating for example have a multitude of different pressures, temperatures, and flame management parameter combinations in their installation sites. For this reason the controller for one installation of this type will have a number of control parameters that differ from controllers for other sites. At the same time, the software implementing the control algorithms may be similar or identical. For this reason, it has become both expensive and logistically difficult to provide the multitude of different factory-programmed controllers needed for every possible operating system configuration.

Another important factor is the need for integrity and accountability in the commissioning process. If the proper parameters are not loaded into the microprocessor memory during commissioning, at the very least, the operating system will run inefficiently; at the worst, unsafely. At the same time, keeping costs down and controller selection simple is important.

Another concern is the potential for tampering. Once a controller has been properly selected or commissioned for a specific operating system, it is important that the parameters not be changed, or be changed only by authorized persons. Since the latter is difficult to guarantee, the trend now is to include features in controllers that prevent unauthorized changes to the design. If a new controller design is required, the preferred way is simply to replace the old controller with a new, properly commissioned unit.

BRIEF DESCRIPTION OF THE INVENTION

We have developed a new system for commissioning a controller that allows the system parameters to be specified during the commissioning event by a permanent readable label attached to an external surface of the controller. Features of this process provide a high level of integrity and accountability with respect to the final configuration of each commissioned controller. In this context, it goes without saying that an uncommissioned controller should not be able to initiate any activity by any operating system.

This system also improves accuracy in specifying the parameters to be loaded into a programmable memory of a controller to be commissioned. Devices such as data recorders, hand-held computers or PDAs, and other related devices that are commissioned or prepared for specific tasks, may be included in the term “controller”.

A commissioning system supplies to a data port of the controller a commissioning signal encoding at least one parameter value. The controller has a surface bearing a label on which is imprinted a code pattern specifying in some way the at least one parameter value.

The commissioning system comprises a processor for providing the commissioning signal encoding each parameter value responsive to a read label signal encoding a code pattern specifying the particular parameter value. A label reader reads the code pattern on the label of a controller to be commissioned and providing a read label signal encoding the parameter value or values specified by the code pattern imprinted on the label. The parameter value or values are loaded into the controller’s programmable memory either directly from the data port, or by a processing unit forming a part of the controller.

A preferred version of the commissioning system is for use with a controller having a predetermined position for the label. Such a commissioning system includes a commissioning station for mounting or docking the controller in a predetermined position. The commissioning station includes a data port for communicating with the controller data port. The commissioning station data port is connected to receive the programming signal from the processor. The commissioning station supports the label reader in position to read the label in the predetermined label position on the controller when the controller is in the predetermined controller position in the commissioning station.

BRIEF DESCRIPTION OF THE DRAWINGS

FIG. 1 is a functional block diagram of a commissioning system for loading parameter values into a controller.

FIG. 2 shows the configuration for one version of the commissioning station of FIG. 1, for holding a controller shown in position for mounting in the commissioning station.

FIG. 3 is view of a controller with orientation reversed with respect to that of FIG. 2.

FIGS. 4*a* and 4*b* show one version of a label for affixing to the controller of FIGS. 1, 2, and 3.

DESCRIPTION OF THE PREFERRED EMBODIMENTS

FIG. 1’s block diagram shows a commissioning system 40 having the purpose of preparing, or “commissioning”, any desired number of controllers 20 to each control a specific one of a variety of similar operating systems that differ in small but crucial details. The term “commissioning” in this context refers to loading parameters into a programmable memory 20*a* of controller 20 to prepare or configure controller 20 for controlling a selected operating system. The term “programmable” in this context means that data can be written into memory 20*a* when placed in a specific write mode and not otherwise. Further, once a programmable memory has been written, it will not lose the data written into it, and this data can be repeatedly read in the normal manner. Electrically erasable programmable read-only memory (EEPROM) and flash memory are two types of programmable memory currently in use. Either is suitable for use as memory 20*a*.

Controller 20 also may have a permanently written read-only memory (ROM) 20*b* that stores firmware for performing the control algorithms needed for controlling the operating system. It is possible that in certain situations, memory 20*a* will contain firmware or software that is loaded as part of the commissioning procedure.

System 40 includes a processor 41 for controlling overall operation of system 40. Processor 41 has its own internal memory 43 that stores firmware whose execution controls the operation of processor 41. Processor 41 may be any suitable microprocessor typically used for control or computing applications. Processor 41 may include a floppy or other replaceable medium drive 42 for updating memory 43 and as a source for commissioning parameter values. A part of memory 43 may contain firmware for checking cyclic redundancy code (CRC) data provided to processor 41 as part of data files. The execution of this firmware creates a CRC checker shown at 41*a*.

System 40 includes a commissioning station 10 having a label reader 15 and a commissioning station plug 21*b* incorporating a number of individual sockets at 13 and 14 that form connector elements. Note that neither commissioning system 40 nor commissioning station 10 form a part of an operating system to be controlled by controller 20. However, unique features of commissioning station 10 to be explained are important to accurate and reliable commissioning procedures.

A typical controller 20 as shown in FIGS. 2 and 3 has an external surface 29 through which connecting pins as at 23 and 24 project. Connecting pins at 23 and 24 are in electrical connection with internal electronics of controller 20, and are incorporated in a controller plug 21*a*. Connecting pins at 23 and 24 form connectors for electrically connecting controller 20 to the operating system after commissioning. Pins at 23 and 24 connect to commissioning station 10 during commissioning through sockets at 13 and 14 (FIG. 2) of plug 21*b*. In the embodiment shown plug 21*b* provides both power and data connections for controller 20 from system 40. Another embodiment of commissioning station 10 may be for a controller 20 with an internal power source for operating memory 20*a* during the commissioning operation.

The label reader 15 in commissioning station 10 provides a read label signal to processor 41 on a two-way data path comprising conductors forming part of a cable 22. Operating commands are provided to label reader 15 by processor 41 on the data path in cable 22. Label reader 15 receives power from any convenient source such as a dedicated power supply within itself or from a power supply for system 40, not shown in FIG. 1.

Commissioning station plug 21*b* is connected to processor 41 by a cable 16 including conductors forming a two-way data path passing through plugs 21*a* and 21*b*. The individual sockets at 13 and 14 (FIG. 2) of plug 21*b* are connected to individual conductors in cable 16, and during a commissioning operation mechanically and electrically contact the connecting pins at 23 and 24. Station 10 and processor 41 may if desired be combined in a single housing so that no external cables 16 and 22 are visible.

Commissioning system 40 may include an optional keyboard 46 allowing a user to directly input data and/or commands to processor 41. An optional monitor 45 allows processor 41 to display information for the user. Both the keyboard 46 and the monitor 45 may be conventional devices. The keyboard 46 may be used to designate already-loaded commissioning parameter values or parameter value groups. An Internet connection 49 is also optional and may have particular utility when commissioning requires either large data blocks or access to a large number of data blocks.

System 40 may be configured in a number of different ways. A system 40 having a special purpose processor 41 along with an optional printer 48, keyboard 46 and monitor 45 as shown in FIG. 1 in addition to commissioning station 10, may be used for commissioning. Alternatively, system 40 may include a general-purpose processor 41 such as a desktop or laptop PC having the various optional peripheral devices shown in FIG. 1 along with a station 10. Such a system 40 can be used for a variety of personal computer tasks as well as for commissioning controllers 20. A dedicated system 40 may also include a standard PC having software designed for implementing the invention and incorporating station 10 and any or all of the indicated optional functions. Where system 40 is used to commission controllers 20 intended for safety-critical situations, qualification agencies will most likely require that system 40 be dedicated to the single purpose of commissioning controllers.

FIG. 2 shows controller 20 aligned for mounting on station 10. Data pins 23 and the data sockets 13 into which the data pins 13 insert serve as a data port allowing communication between controller 20 and processor 40. Direct electrical connection seems to be the most convenient way to form the data port for controller 20, but other types of data ports using for example optical or magnetic links for data transfer are suitable as well, and should be considered equivalent.

Sockets 14 into which two or more power pins 24 are inserted when controller 20 is mounted on station 10 conduct power to controller 20 from any convenient source. The source of the power for controller 20 during the commissioning operation can also be an internal power supply in commissioning system 40 but not shown.

Controller 20 has what we call a predetermined mounting position on station 10 when plugs 21*a* and 21*b* are mated, with pins 23 and 24 inserted into sockets 13 and 14 respectively. Controller 20 should not be easily mountable on commissioning station 10 in other than the predetermined mounting position. Plug 21*a* forms a controller 20 mating feature. Plug 21*b* forms a station 10 mating feature into which the controller 20 mating feature fits. Mating the controller mating feature with the station mating feature, places controller 20 in the predetermined mounting position. Where there is no direct electrical connection between station 10 and controller 20, topographical features of controller 20 and station 10 should be provided that mate or connect with each other in one way only to serve as the mating features that place controller 20 in the predetermined mounting position on station 10.

The label reader 15 of commissioning station 10 includes a scanner surface 15*a* shown in outline in FIG. 2. The position of scanner surface 15*a* must bear a specific spatial relationship to the position of plug 21*b*. Label reader 15 can comprise any type of device suitable for reading a code pattern 28 imprinted on a label 25 (FIG. 4*a*) to be mounted on the exterior of controller 20 (see FIG. 3) and closely juxtaposed to scanner surface 15*a* when controller 20 is in the predetermined mounting position. Code pattern 28 encodes data specifying in one way or another the parameter values to be loaded into memory 20*a* during the commissioning operation. Label reader 15 must of course be compatible with whatever type and format of code pattern 28 is present on label 25.

The external surface 29 of controller 20 has an area designated as the predetermined label position at which a label 25 must be affixed before controller 20 is installed in the predetermined mounting position for commissioning. A marking or other feature 27 as shown in FIG. 3 designates the predetermined label position and helps to align a label 25 to be affixed to controller 20. The predetermined label position must bear a specific spatial relationship with respect to the of plug 21*a*. This spatial relationship must match the spatial relationship between the scanner surface 15*a* and plug 21*b* so that when plugs 21*a* and 21*b* are mated, scanner surface 15*a* is positioned to read a code pattern 28 on a label 25 mounted in the predetermined label position on controller 20.

FIGS. 4*a* and 4*b* show one possible arrangement for a label 25. Of course, code pattern 28 must be located on label 25 so that scanner surface 15*a* is juxtaposed when the label 25 is in the predetermined label position on a controller 20 and the controller is in the predetermined mounting position on station 10. The code pattern 28 shown in label 25 of FIG. 4*a* has a bar code format and is located in a predetermined code pattern field or area 31 defined by the dotted lines. We prefer that code pattern 28 has a CRC field 28*b* that allows CRC checker 41*a* to test the integrity of the data as read from code pattern 28 by label reader 15.

Label 25 also includes text fields or areas 30 and 32 in which human readable text is printed. Field 30 may display a model or configuration number that specifies the group of values encoded in code pattern 28 and eventually to be loaded into memory 20*a*. Field 32 in one version displays readable commissioning signal parameter values specified by the code pattern 28 data. The size of a label 25 must be adequate to hold all of the printed material in fields 30 and 32 and code pattern 28 as well. In some circumstances code pattern 28 may be formed from OCR-type characters, in which case fields 30 and 32 may be superfluous, and field 28 may be expanded to cover the entire area of label 25.

Various encoding schemes are available that allow a code pattern 28 having an area of a square inch or two to hold several hundred bytes of optically readable data printable by conventional processes. In some cases however, a printed code pattern 28 may not be able to hold all of the data required for commissioning a controller 20. In such a case, code pattern 28 may include a selector field 28*a* specifying that a block of data is stored elsewhere to be encoded in the commissioning signal. The part of code pattern 28 not forming code pattern 28*a* may designate the source of such an off-label block of data.

Several options for off-label data sources exist. Code pattern 28 can provide a pointer, addressing value, or Internet URL according to well-known practice that specifies the precise location of the off-label data source. Some of these sources include a floppy disk in floppy drive 42, preloaded data in memory 43, or data supplied by an Internet connection 49. The keyboard 46 can be used to select data sources or even input data to be printed on label 25. It is important to realize that keyboard 46 data should be included in a commissioning signal only when formatted as data in code pattern 28. One feature of this invention is to reduce the chance for operator error, and directly using keyboard 46 data is inconsistent with this philosophy.

Where an off-label data source is specified by a preprinted code pattern 28, the values printed in fields 30 and 32 may not reflect the actual commissioning parameter values, but instead may designate the source of the data, the intended operating system, the date of commissioning, etc. At any rate, fields 30 and 32 should leave no question as to the operating system for which a commissioned controller 20 is intended. These same comments apply as well to a code pattern 28 comprising OCR data.

We prefer to attach label 25 relatively securely to the external surface 29 of controller 20 in the predetermined label position indicated by feature 27. One way to attach label 25 is with an adhesive layer on the back of label 25 shown in FIG. 4*b*. Alternatively, each controller 20 may be shipped in the uncommissioned state with an adhesive layer covering the surface defining the predetermined label position. Labels printed on plain stock can then be attached in the predetermined label position on the controller 20. External surface 29 may have any suitable configuration that juxtaposes scanner surface 15*a* and code pattern 28. For example, should controller 20 be configured as a circuit board having no housing, surface 29 may be carried on a projecting flange.

Labels 25 may be provided in any of several different ways. For example, a set of one or more labels 25 may be included with an uncommissioned controller 20. During installation the installer selects the appropriate one of those labels to program controller 20, affixes the selected label 25 to the programmer 20 and discards the rest of the labels. Where system 40 includes a label printer 48 for printing labels 25, normally on special label stock, any of the sources listed above for commissioning signal parameter values may be used to imprint the code pattern 28 and the human readable fields 30 and 32 on a blank label. The actual data encoded in code pattern 28 may comprise the commissioning signal parameter values, or may still designate an off-label source.

In one version, two identical labels 28 may be printed. One is affixed to a controller 20 and the other is attached to a nearby surface of the operating system where the controller 20 is installed for use after commissioning. By comparing the text or code patterns on the two labels 28, it is easy to detect if a controller 20 has been improperly mounted or replaced.

The shapes of controller 20 and commissioning station 10 and the positions of sensing surface 15*a* and code pattern 28 should all cooperate to create an access barrier such that sensing surface 15*a* is inaccessible or accessible only with difficulty when a controller 20 is in the predetermined mounting position on commissioning station 10. This makes it likely that only a label 25 mounted on controller 20 will be in the predetermined label position during a commissioning procedure.

When a label 25 is mounted in the predetermined label position on a controller 20 and the controller 20 is in the predetermined mounting position on station 10, scanner surface 15*a* is juxtaposed to the code pattern 28 on the label 25 mounted on controller 20. When so juxtaposed, label reader 15 can read the data encoded in code pattern 28 on the label 25 affixed to controller 20. Control signals sent on data paths within cable 22 activate the reading function of label reader 15 and transmit the data read by label reader 15 back to processor 41 in the read label signal through sockets 13, pins 23, and the data paths within cable 22. The structure of station 10 and the functionality of commissioning system 40 should be such that label reader 15 cannot read a code pattern 28 on a label 25 attached to a controller 20 when controller 20 is in other than the predetermined mounting position. And when controller 20 is in the predetermined mounting position, processor 41 can communicate with controller 20 through data pins 23 and sockets 13, and controller 20 receives power through power sockets 14 and power pins 24. A wide range of configurations for controller 20 and commissioning station 10 that achieve these conditions are possible.

A commissioning event commences by selecting an uncommissioned controller 20. An appropriate label 25 that specifies the commissioning parameters for controller 20 is attached to controller 20 in the predetermined label position. Then controller 20 is mounted on station 10 in the predetermined mounting position, thereby juxtaposing code pattern 28 to scanner surface 15*a* and mating plugs 21*a* and 21*b*. Processor 41 then causes label reader 15 to read code pattern 28. Label reader 15 generates a code pattern signal returned to processor 41 through conductors in cable 22. CRC checker uses the CRC to verify the commissioning data in the code pattern signal, and if correct, proceeds. Otherwise, an error signal is provided for the user. From the code pattern signal, processor 41 determines the commissioning parameter values to be loaded into memory 20*a* and encodes them into a commissioning signal. In this way, the data encoded in code pattern 28 defines the commissioning signal parameter values.

Processor 41 then transmits a commissioning signal through the data paths of cable 16 and sockets 13 and pins 23 to controller 20. The commissioning signal must one way or another cause memory 20*a* to enter its write mode. The commissioning signal may cause controller 20 to load data forming a part of the commissioning signal into memory 20*a*, or certain of the data pins 13 may form a direct connection to memory 20*a*, in which case other components of controller 20 may then be uninvolved. When the commissioning signal has been received and the parameters have been loaded into memory 20*a*, controller 20 may provide a response to processor 41 through sockets 13 and pins 23 confirming that fact. In general to create a high level of confidence that the commissioning parameters have been loaded accurately into memory 20*a*, the commissioning parameters must be read and compared to those from which the commissioning signal was formed.

One can see that by closely tying the parameter values stored in the memory 20*a* of a controller 20 to a readable pattern and text affixed to the controller 20 in label 25, the user can assure that the controller 20 has been properly commissioned and is mounted to control a particular operating system.

Where controller 20 is intended for a safety-critical system, the parameters loaded into memory 20*a* during a commissioning procedure must be tested for accuracy. Regardless of the source, a file of commissioning parameters for a safety-critical system must have attached a CRC. Such a file can then be tested after every data transfer operation during the commissioning procedure to thereby insure data integrity. We expect that the typical controller 20 will be programmed to test this same CRC at convenient times during the control operations to assure that the commissioning parameters have not been corrupted.

One further desirable feature during commissioning is testing individual commissioning parameters for reasonableness. This can be done by commissioning system 40 using information provided by an off-label source if used, by processor-based off-label sources, or even by controller 20 itself.

What is claimed is:

1. A commissioning system for supplying to a controller a commissioning signal encoding at least one parameter value, said controller having a surface bearing a label on which is imprinted a code pattern specifying the at least one parameter value, said commissioning system comprising:

a) a processor for providing the commissioning signal encoding each parameter value responsive to a read label signal encoding a code pattern specifying the particular parameter value; and b) a label reader for reading the code pattern on the label of the controller and providing the read label signal encoding the code pattern imprinted on the label.

2. The commissioning system of claim 1 for use when said controller bears the label in a predetermined label position, said commissioning system including a commissioning station for mounting the controller in a predetermined mounting position, said station including a data path for communicating with the controller, said data path connected to carry the commissioning signal from the processor to the controller, wherein the label reader has a scanner surface on the commissioning station for sensing a juxtaposed code pattern, and said commissioning station supports the label reader scanner surface in position to sense the code pattern of a label in the predetermined label position on the controller when the controller is in the predetermined mounting position.

3. The commissioning system of claim 2 for use when the controller has a controller plug forming a mating feature of the controller, wherein the commissioning station has a mating feature for mating with the controller mating feature to place the controller in the predetermined mounting position.

4. The commissioning system of claim 3 for use when the controller has at least one connector element for carrying at least one of the commissioning signal and controller power, wherein the commissioning station includes a commissioning station plug having at least one connector element, and for mating with the controller plug, for carrying the at least one of the commissioning signal and controller power.

5. The commissioning system of claim 4, wherein the processor receives the read label signal, and responsive to the data encoded therein, provides a commissioning signal to the controller plug encoding data encoded in the read label signal.

6. The commissioning system of claim 4, further designed for commissioning the controller whose label includes a selector field whose contents specify an off-label source for commissioning parameters, wherein the processor receives from the label reader a read label signal encoding the contents of the selector field, accesses the off-label source for commissioning parameters specified by the selector field contents, and transmits a commissioning signal encoding parameter values provided by the off-label source.

7. The commissioning system of claim 4, wherein the processor provides the commissioning signal for use with a controller memory element comprising a memory writable responsive to the commissioning signal.

8. The commissioning system of claim 2, for use with controllers having a plug having power conductors for providing power to the controllers, and wherein the commissioning station has a plug having power conductors mating with the power conductors of any of the controllers when any one of the controllers are in the predetermined mounting position on the commissioning station.

9. The commissioning system of claim 2, wherein the label reader scanner surface is positioned to access a predetermined label position that is inaccessible when the controller is in the predetermined mounting position.

10. The commissioning system of claim 2, wherein the shapes of the controller and the commissioning station and the positions of the scanner surface and the code pattern all cooperate to create an access barrier to the label reader scanner surface when a controller is in the predetermined mounting position on the commissioning station.

11. A commissioning station for use in a system for commissioning a controller having a memory for recording at least one commissioning parameter, and including an external surface having i) a predetermined label position at which is attached a label having a code pattern specifying a commissioning parameter and ii) a controller connector plug for data communication in predetermined relation to the predetermined label position; said station including a) a station connector plug for mating with the controller connector plug and for transmitting the commissioning parameter to the controller, said station connector plug when mated with the controller connector plug, placing the controller in a predetermined mounting position on the commissioning station;

b) a label reader having a scanner surface juxtaposed to the predetermined label position when the controller is in the predetermined mounting position.

12. The commissioning station of claim 11, wherein the shapes of the controller and the commissioning station and the positions of the scanner surface and the code pattern all cooperate to create an access barrier to the label reader scanner surface when a controller is in the predetermined mounting position on the commissioning station.

13. The commissioning station of claim 11, wherein the station connector plug includes a plurality of conductors for carrying power to the controller.

14. A process for commissioning an uncommissioned controller having a writable memory and a connector plug, comprising:

a) mounting on the uncommissioned controller in a predetermined label position a label having a code pattern specifying at least one commissioning parameter, b) mounting the uncommissioned controller in a predetermined mounting position on a commissioning station having a label reader with a scanner surface juxtaposed to the predetermined label position on the mounted controller;

c) reading the code pattern with the label reader; and d) transmitting the commissioning parameter specified by the code pattern to the writable controller memory through the connector plug.

15. The process of claim 14, including the further step of providing operating power to the controller through the connector plug from the commissioning station while the controller is mounted on the commissioning station.

16. The process of claim 14, including the step, prior to the label mounting step, of printing on a blank label a code pattern specifying at least one parameter to be loaded into the writable controller memory.

17. The process of claim 16 wherein the code pattern encodes a commissioning parameter, and wherein the parameter-transmitting step includes the step of transmitting the commissioning parameter read by the label reader to the writable controller memory.

18. The process of claim 16, wherein the label printing step includes the step of printing a code pattern incorporating commissioning parameters provided from at least one of a disk medium and an Internet connection.

19. The process of claim 16, including the steps of computing a CRC value, and of encoding the computed CRC value in the code pattern.

20. The process of claim 19, including the steps of computing the CRC value of the commissioning parameter encoded in the code pattern, and comparing the computed CRC value of the commissioning parameter encoded in the code pattern with the CRC value encoded in the code pattern.

* * * * *